Jan. 20, 1959   J. O. FORSTER   2,869,224
SEATING TOOL FOR WIRE COIL SCREW THREAD INSERTS
Filed Jan. 5, 1955
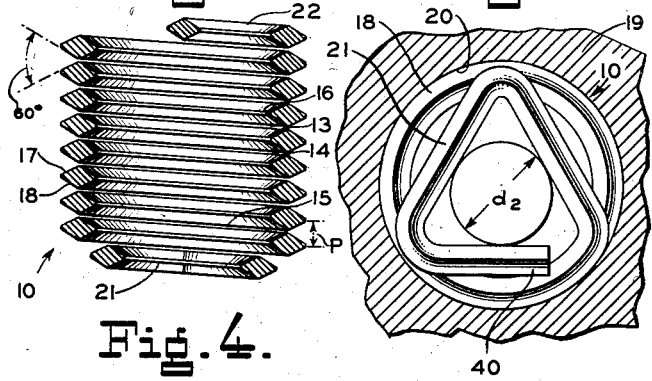
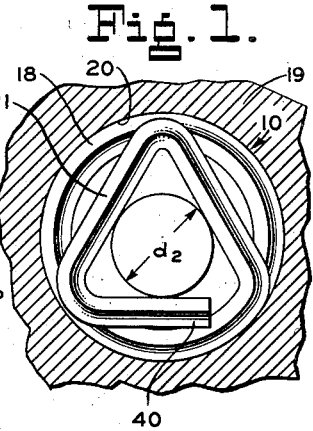
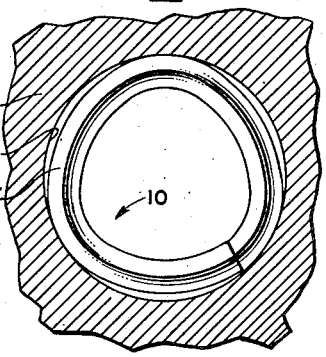
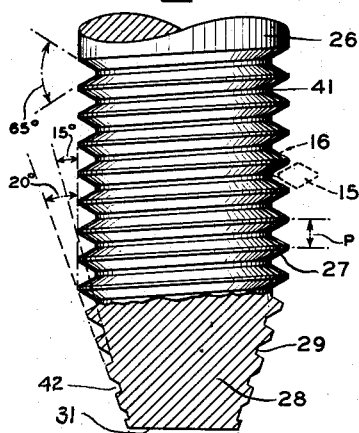
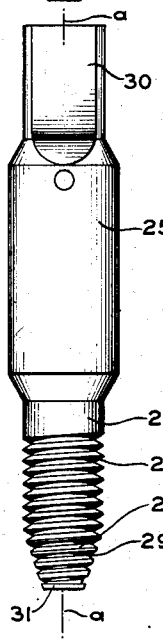
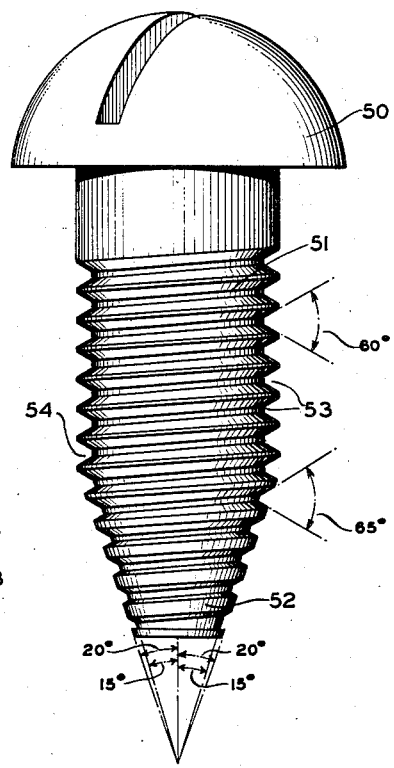
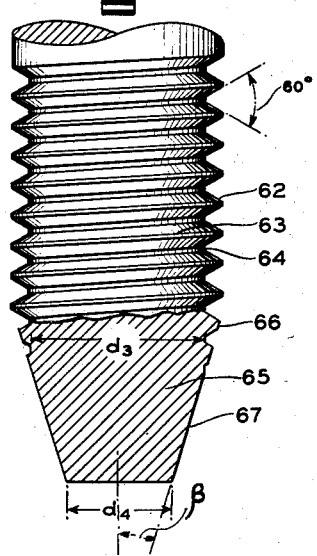
INVENTOR.
JOHN O. FORSTER
BY Walter S. Bleston
ATTORNEY

United States Patent Office 2,869,224
Patented Jan. 20, 1959

2,869,224

SEATING TOOL FOR WIRE COIL SCREW THREAD INSERTS

John O. Forster, Harrison, N. Y., assignor to Heli-Coil Corporation, Danbury, Conn., a corporation of Delaware Application January 5, 1955, Serial No. 480,051

2 Claims. (Cl. 29—240.5)

The invention relates to a seating tool for wire coil screw thread inserts and more particularly for such inserts which are provided with a grip end of a triangular or other multi-angular configuration, this application being a continuation in part of my co-pending application Serial No. 439,282 of June 25, 1954, is now abandoned. The grip ends of multi-angular configuration of the insert coils which are used as linings or bushings of tapped holes, encompass the axes of the inserts through angles of more than 180 degrees. The corners of the multi-angular grip end are located on a helix in continuation of the insert coil body and the sides or legs of the grip end form in a sense chords or at least part of chords of that helix. A tool can be introduced from the other end of the coil so as to engage the multi-angular end from the inside and, by turning the tool with the insert thereon, the latter can be screwed into the tapped hole for which it is destined. Mostly the wire coil will be contracted during the insertion and will, then, springingly expand after the withdrawal of the inserting tool so that its convolutions fittingly engage the thread groove of the tapped hole. In many instances, it will be necessary to reform the multi-angular grip end so that a screw screwed into the inserted coil can be passed through the entire length of it.

The invention aims, therefore, to provide a tool whereby the multi-angular grip end of a wire coil screw thread insert can be so reformed, widened or expanded that it can be properly seated in the tapped thread groove and that a screw cannot only engage the reformed grip end but even be screwed through it. In reforming the grip end, the tool will not and is not intended to change the originally multi-angular form into a true circular one, so that the end convolution of the insert perfectly fits the periphery of the thread groove of the tapped hole throughout. A reformation to only such an extent that the grip end remains slightly non-circular is advantageous and, therefore, desirable as the reformed, not entirely circular insert end will exercise a tight hold on the stud or bolt screwed through it so that a locking effect can be attained.

Essentially the tool, according to the invention, comprises a cylindrical screw threaded shaft portion fitting the inner screw thread formed by the inserted wire coil and being provided with a tapered end on which the thread of the cylindrical portion is continued in a certain way, as it will be more fully described hereinafter.

In some instances it will be possible to dispense with a separate seating tool which will have to be removed after each seating operation, if the screws intended to be screwed into the inserts are provided with the aforementioned taper so that they can perform the function of the seating tool. Such screws may stay in place once they have reformed the grip ends of the inserts. Therefore, whenever in this specification and the appended claims the term "tool" is used, it is to be understood to mean not only an instrumentality intended to be applied repeatedly to a plurality of inserts with multi-angular grip ends but also to a correspondingly shaped screw or other male threaded member which, having performed the function of a separate seating tool of the mentioned kind remains in position as a member of a screw connection including a boss or nut with a tapped hole, the wire coil lining with the grip end, and the screw having been instrumental to reform that end.

The invention further aims to provide a tool of the mentioned type in which the pitch throughout the cylindrical and the tapered portion is constant, but the crests of the thread convolutions along the tapered portion progressively decrease in height, and wherein, depending on the type of insert for which the tool is destined, the pitch diameter may also be progressively reduced. Thereby the tool end can engage in the multi-angular grip end of the insert coil, and by screwing the tool in, the sides of the multi-angular configuration can be urged outward into a more or less true, circular form, so as to be safely seated in the tapped hole lined by the coil.

However, I have found that, in many instances, too much friction is set up between the tool and the grip end of the insert if the included angles between the flanks of the tool thread and of the grip end cross-section are equal so that a wedging effect can take place and the insert urged out of the tapped hole. Therefore, another object of the invention is the provision of a tool having a thread form somewhat different from the cross-section of the insert for which the tool is destined so that the occurrence of a wedging effect will be avoided.

Further details and objects of the invention will be apparent from the description given hereinafter and the accompanying drawing illustrating embodiments thereof by way of example.

In the drawing:

Fig. 1 is an end plan view of an insert coil with a multi-angular grip end inserted in a tapped hole of a boss member, the end of a tool according to the invention being applied to the grip end, Fig. 2 is a longitudinal cross-section of the insert of Fig. 1, Fig. 3 is a side elevation, partly in section of a tool according to the invention, Fig. 4 shows a portion of the tool on the same scale as Figs. 1 and 2, Fig. 5 is an end plan view similar to Fig. 1 after the application of the tool which has been removed, Fig. 6 is a side elevation of a modified tool, and Fig. 7 is a side elevation of a part of another modified tool, all the figures, except Fig. 3 which is approximately on a natural scale, being greatly enlarged.

Referring now to the drawing, the tool according to the invention, is to be used with a wire coil screw thread insert of the type shown in Figs. 1, 2 and 5. In Figs. 1 and 5 the insert 10 destined to receive in its inner portion the male member of a screw connection forms, in the illustrated embodiment, an inner or nut thread according to the American National Screw Thread standards. Thus, the flanks 13 and 14 of the cross-section of the wire 15 include an angle of 60 degrees and form a crest 16 of a width equal to about .25 $p$, wherein $p$ is the pitch of the screw thread. The angle between the flanks 17 and 18 is also 60 degrees. The cross-section of the coil wire is best seen in Fig. 2. However, it is to be understood that the tool according to the invention is useful too for other cross-sections provided the tool is shaped according to the principle which will be explained hereinafter. Insert coil 10 lines, in Fig. 1, the tapped hole of a boss or nut member 19, the inner thread 20 of which is formed to receive fittingly the coil portion formed by the outer flanks 17 and 18. The end 21 of the coil, leading during the insertion in the nut member 19, is bent so as to form a grip of a suitable multi-angular configuration which, in the present case, is shown as a triangle, with a free leg 40.

The tool according to the invention and illustrated in Fig. 3 is destined to be inserted from the opposite coil end 22 and to engage the grip end 21 so as to reshape it into a more or less circular form substantially as shown at 21' in Fig. 5. The tool, as shown in Figs. 3 and 4, comprises a shank 25, a cylindrical portion 26 with an external thread 27 and a tapered end 28 with a thread 29 in continuation of the thread 27. The opposite end 30 of the shank may be provided with any conventional means for applying a torque about the tool axis $a$—$a$. For this purpose the end portion 30 of the illustrated embodiment is shown with a square cross-section which may be clamped in the chuck of a prime mover or of a brace or the like. The end 31 of the taper 28 is of a diameter $d_1$ at least slightly smaller than the diameter $d_2$ of the inscribed circle of the grip end 21. The screw threads 27 and 29 are of the same pitch as the coil 10 for which the tool is destined.

It is the intention to use the tool by screwing it into an insert coil of proper size lining the tapped hole of a boss or nut member. When the tool is screwed in far enough, its tapered end will engage the grip end of the insert, and, while continuing to advance in the axial direction, it shall urge the sides of the grip end outward thereby reforming these sides so that they engage into the thread groove of the tapped hole.

However, in the widening or reshaping of the grip end in the indicated manner some harmful occurrences must be avoided. On the one hand, the axially progressing tapered tool end tends to urge at least the free leg 40 of the grip end of the coil out of the correct pitch of the insert convolutions. On the other hand, the friction between the turning tool and the grip end tends to take the latter along and with it the whole insert which, thus, may be screwed further downwards in the tapped hole than desired, that means, the insert may be screwed out entirely if the tapped hole is throughgoing, or it may be screwed down in a blind hole so far that the tapered tool end cannot advance any more in relation to the insert. I have found that the first mentioned difficulty can be avoided if the root diameters are located on a taper the angle of which is between 10 and 25 degrees. This taper will result in a gradual seating operation whereby the seating of the grip end, i. e. the reshaping operation, is distributed over several convolutions whereas a larger taper angle would cause an abrupt reshaping action tending to dislodge the grip end. A similar result will, of course, be attained if the instrumentality cutting the thread on the tool end will be so adjusted that the pitch diameters are located on a taper of between 10 and 25 degrees as in that event the root diameters will be located too on a corresponding taper. However, in order to avoid that the length of the tapered tool end becomes excessive and also in view of the principle applied to avoid the second danger, the angle of the taper of the outside diameter may be made about 5 degrees larger than the taper of the root diameter so that the tapered poriton may not be longer than the chamfered thread portion of a conventional tap.

The mentioned second difficulty can be avoided by reducing the friction between the tool thread and the grip end as much as possible. This can be accomplished according to the invention by taking care that no wedging action between the grip end of the insert and the screw thread of the tool can occur, and that only the crest between the flanks of the wire in the grip end bears on the root of the thread groove of the tool. For this purpose, the root of the thread groove of at least the tapered tool portion can be made wider than the crest between the two inner wire flanks of the insert coil. However, even then it may happen that one of the flanks of the wire in the grip end still bears frictionally against the adjacent flank of the tool thread, if the included angle of the groove of the tool is equal to the included angle of the wire flanks. For this reason, it is advisable to make the included thread groove angle somewhat, i. e. between 4 and 10 degrees, larger than the included angle of the wire flanks. Thus, if the angle of the wire is 60 degrees as in the American National Screw Thread Standards, the groove angle of the tool may be between 64 degrees and 70 degrees. If, on the other hand, the insert is for British Whitworth screw threads having a 55 degrees screw form, the tool thread would have an included angle of 59 to 65 degrees. For the metric or other screw thread systems the included angle of the tool may be selected accordingly. In the preferred form of the tool all the mentioned measures will be taken. However, depending on the circumstances, taking only the one or the other may be sufficient.

Thus, in Fig. 4, showing the preferred form of the tool, the angle of the taper of the outside diameters is 20 degrees, and the angle of the taper on which the roots 42 of the thread groove 29 are located is 15 degrees. Furthermore, the width of the roots is slightly larger than the inner crest 16 of the insert wire. Hence, if the crest 16 is made according to the American National Screw Thread Standard, i. e. ¼ $p$ wide, then the width of the root 41 may be made about 5/16 $p$.

In using the tool the tapered end will be inserted in the insert from the end 22 and when the threads of the tool engage the convolutions of the coil, the tool will be screwed in. As soon as the tapered end 28 enters the end 21 of the insert, it will urge the legs of the triangle outwards so as to embed them in the thread groove of the boss which is lined by the insert coil. Although finally at least a portion of one thread convolution of the cylindrical tool portion will engage the grip end and tend to urge it in engagement with its entire periphery, after the removal of the tool the grip end will, in most instances, come back to a form approximately as shown in Fig. 5. In this connection it is also to be considered that in order to obtain a truly circular form of the grip end it would be necessary that the cylindrical tool portion would press the grip end fully into the inner thread 20 of the boss. This, however, does not happen as there is to be a certain clearance between the minor diameter of the assembled insert and the minor diameter of the cylindrical portion of the tool. This clearance which is visible in Fig. 4 between the crest 16 and the root 41 is necessary in order to screw the tool with very little friction through the cylindrical portion of the insert. The advantage attained by the not truly circular shape of the reformed insert end has been mentioned hereinbefore. It consists in that this insert end will exert a tighter grip than a circular one on a screw member screwed into it.

As stated hereinbefore the "tool" according to the present invention may be in the form of a screw which would remain in an insert coil after having reshaped the grip end. Such screw may differ from the tool of Fig. 3 merely or mainly in the shape of the head which may be hexagonal or slotted, or may have any other conventional form. Particularly in such a screw it may be desirable to have the thread of the cylindrical portion shaped according to the same standard system as the cross-section of the insert coil wire, and have only the threads of the tapered end and perhaps only one or two convolutions on the cylindrical portion formed as described with respect to Fig. 4. In that event, the tapered screw end would perform the reshaping of the grip end whereas the major part of the cylindrical portion could be in the insert of any desired class fit. A screw of such a type is shown in Fig. 6 which comprises a slotted head 50, a cylindrical portion 51, and a taper 52. In this case, the thread 53 is in full accordance with the selected standards which again are the American National Screw Thread Standards. Beginning with the second convolutions 54 above the taper and throughout the taper the thread has an included angle of 65 degrees and a root width slightly wider than that of the thread 53. Furthermore, on the portion 52, the ends of the root diameters are located on a taper with a 15 degrees angle whereas the taper angle for the outside diameters is 20 degrees. If this screw is screwed down in an insert coil with a grip end of multi-angular configuration it will have the same effect on that coil end as the tool according to Fig. 4. In addition, when the threads 54 have reshaped the grip end and the cylindrical portion 51 stays in engagement with the coil body, this "tool" may have the desired fit in the latter, and in addition, the strong friction hold exercised by the reshaped grip end on an engaged thread of the cylindrical portion, will cause a very considerable locking action between the screw-connected parts.

It has been stated, that not all the recommended features must be present in a tool according to my invention. Particularly, with insert coils of relatively larger wire cross-section in which the multi-angular grip end is not readily bent in the axial direction, it may not be necessary to continue the thread in the taper to the ultimate end and, furthermore, it may not be necessary to apply a larger included thread angle between the flanks of the tool than between the flanks of the wire of the insert coil for which the tool is destined. However, if the mentioned included angles are alike, it is advisable to make the root of the thread groove in the tapered portion wider than prescribed by the standards. On the other hand, if the width of the root is in accordance with the standards, then the included angle of the thread groove flanks should be larger than according to the standards. Both measures, as it has been stated, held to decrease the friction which otherwise may cause a shift of the insert rather than a reshaping of the grip end.

In accordance with the foregoing, the tool illustrated in Fig. 7 is similar to that of Fig. 4 except for certain features. The head and shank portion may be the same as the portions 30 and 25, respectively, in Fig. 4. The thread 62 of the cylindrical portion 63, however, has the standard included angle of 60 degrees but a root 64 slightly wider than the standard width. Only one taper is applied, so that in the end portion 65, the major diameters are progressively reduced as at 66 without a change of the root diameter $d_3$. The taper angle $\beta$ is shown as 15 degrees which is within the aforementioned limits, and the diameter $d_4$ at the ultimate end is somewhat smaller than that of the inscribed circle $d_2$ in Fig. 1. Now, it will be noticed, that owing to the reduction of the diameters in the tapered end portion, there is a fairly long conical surface 67 into which the thread runs out. The slenderness of the taper when properly selected, together with the stiffness of a wire of larger cross-section, will render it possible to widen the grip end of an engaged insert coil without bending it axially before it enters the guiding threads of the wider portion of the taper.

It will be apparent that modifications and alterations of the structure illustrated and described can be made without departure from the essence and spirit of my invention which, for that reason, shall not be limited but by the scope of the appended claims.

I claim:

1. A screw thread member to be seated in an inner screw thread of substantially V-shaped cross-section formed by a wire coil screw thread insert having a grip end and lining the tapped hole of a boss or nut, said member comprising a cylindrical portion, a tapered free end adjoining said cylindrical portion, and means on the other end of the portion to apply a torque about said cylinder axis thereof, said cylindrical portion and said taper being provided with a continued thread groove of constant pitch, the major part of said thread groove on said cylindrical portion fitting the inner thread formed by said insert coil for which said tool is destined, the thread groove portion on said taper and at least one adjacent groove convolution on said cylindrical portion having an included angle and a width of its root somewhat larger than said major part of said thread groove on said cylindrical portion, the root diameters of said groove in said taper being located on a conical surface including with said axis an angle between 10 and 25 degrees, the angle included between the outside of said taper and said axis being about 5 degrees larger than the aforementioned angle, and the ultimate end of said taper being adapted to engage into said grip end.

2. A tool for seating the multi-angular grip end of a wire coil insert lining the tapped hole of a boss or nut member and forming an inner V-shaped screw thread of one of the standard screw thread systems, comprising a cylindrical portion, a tapered free end adjoining said cylindrical portion, and means at the other end of said portion to apply a torque about the cylinder axis, said cylindrical portion being provided with a screw thread groove according to said screw thread system so as to substantially fit the inner thread of the insert for which said tool is destined, at least a portion of said tapered end being provided with a screw thread groove in continuation of the adjacent thread groove on said cylindrical portion, said thread groove on said taper being of the same pitch and type of shape as the adjoining thread groove on said cylindrical portion but of a depth progressively decreasing towards said free end and being slightly wider than prescribed by said system, the crest of the thread on said taper being of a progressingly increasing width and located on a cone surface including with said cylinder axis an angle between 15 and 30 degrees, the root of said thread groove of said taper being located on a cone surface including with said axis an angle about 5 degrees smaller than the angle between said axis and said cone surface on which said crest is located, and the ultimate free end being of a diameter so as to be adapted to engage into said grip end of said insert.

References Cited in the file of this patent

UNITED STATES PATENTS

| | | |
|---|---|---|
| 806,406 | Farrington | Dec. 5, 1905 |
| 1,909,477 | Trotter | May 16, 1933 |
| 1,966,520 | Rayner | July 17, 1934 |
| 2,363,663 | Findley | Nov. 28, 1944 |
| 2,520,232 | Bereza | Aug. 29, 1950 |